Feb. 6, 1968   J. L. LEESON, JR   3,367,110
DIGITAL SYNCHRONIZING AND PHASE MATCHING SYSTEM
Filed Feb. 1, 1966   9 Sheets-Sheet 1
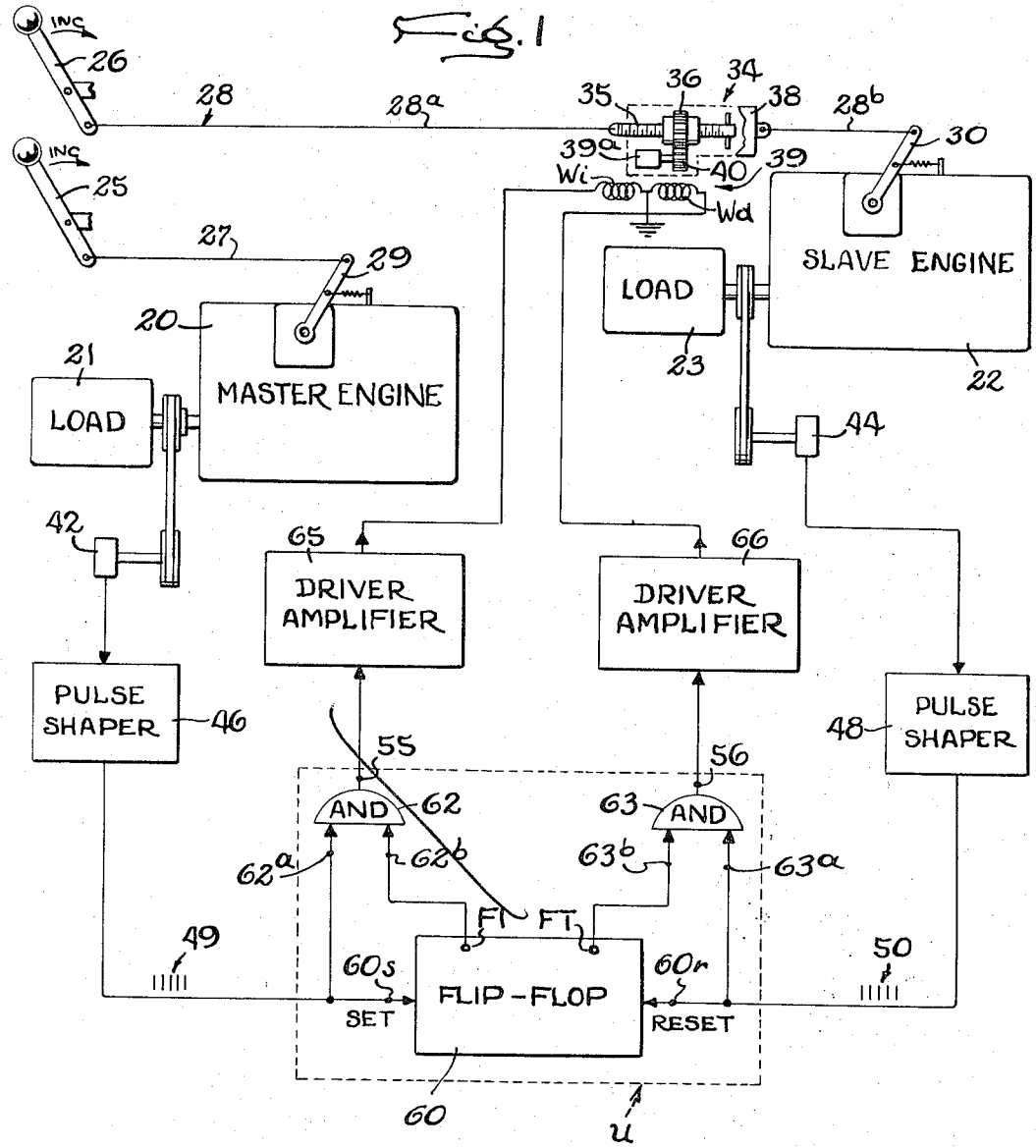
INVENTOR
James L. Leeson, Jr.
by Wolfe, Hubbard, Voit & Osann
ATTORNEYS

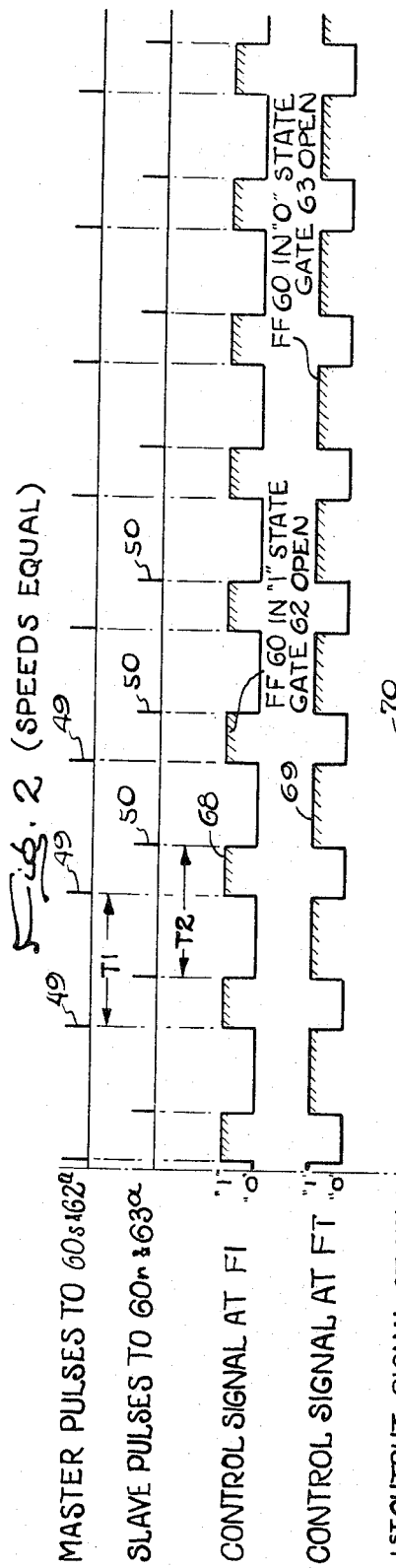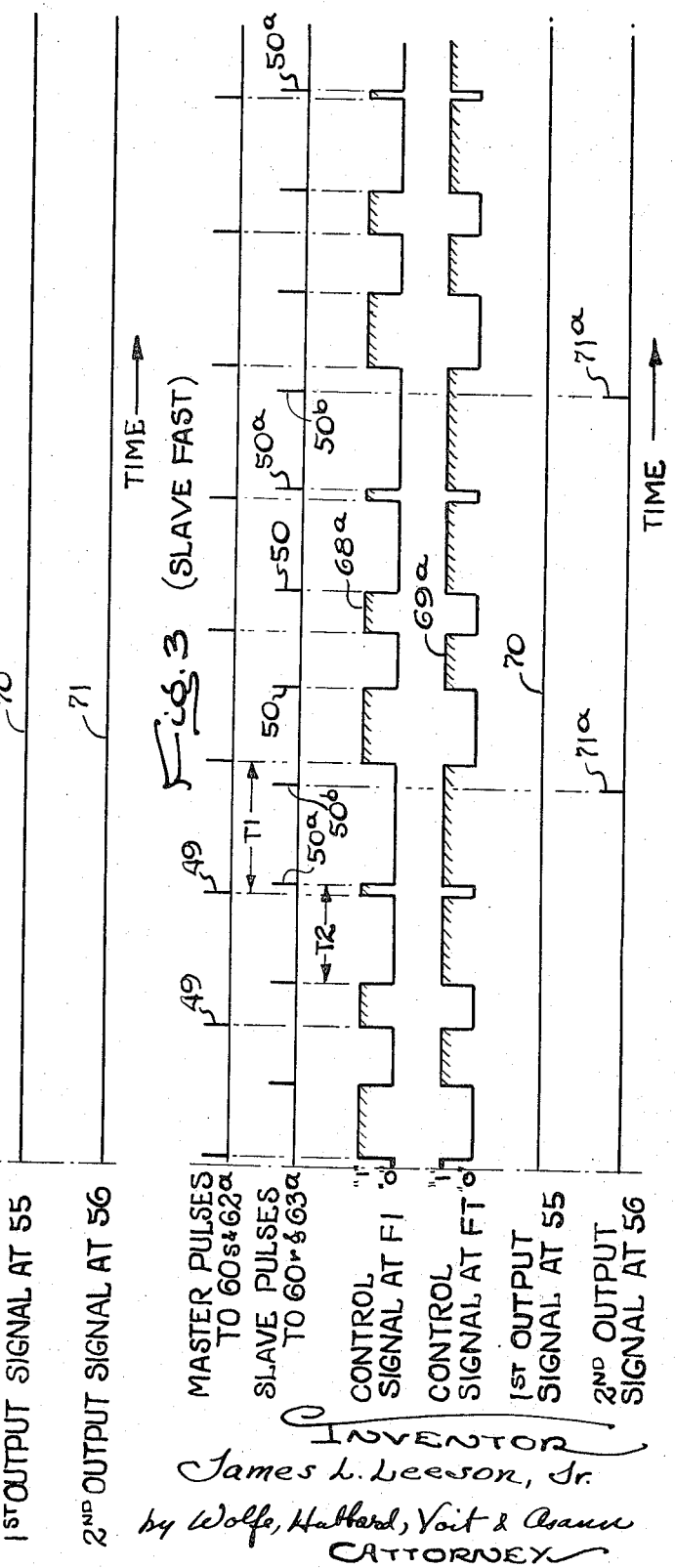

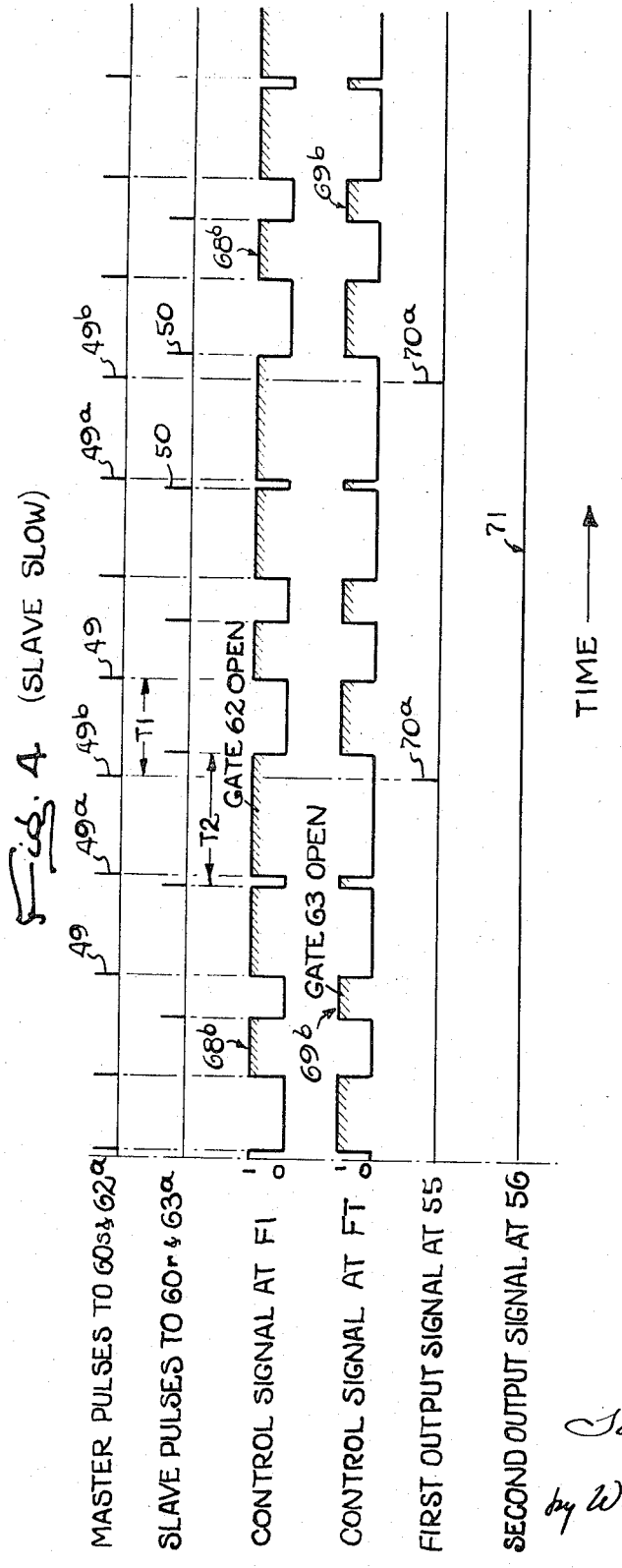

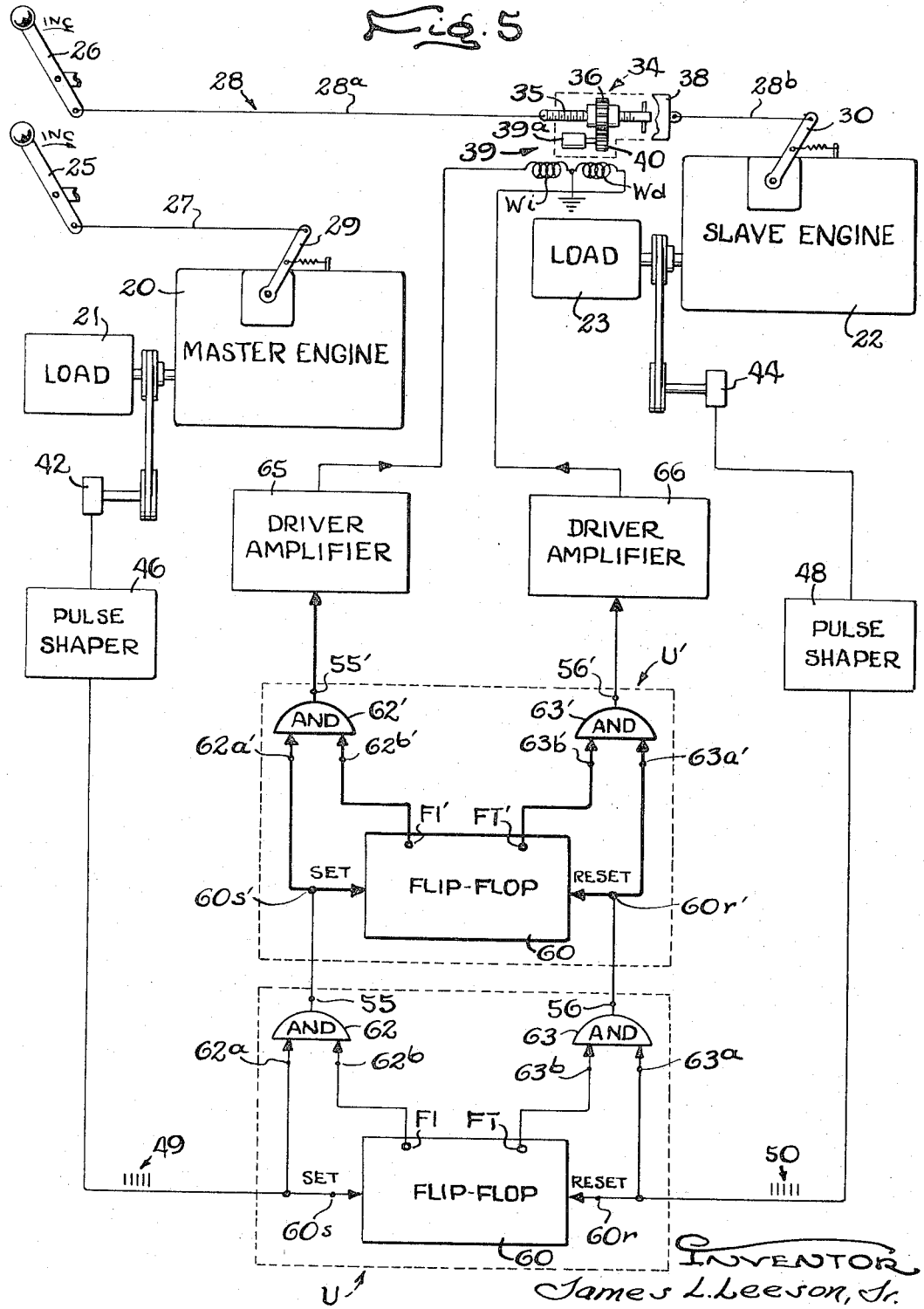

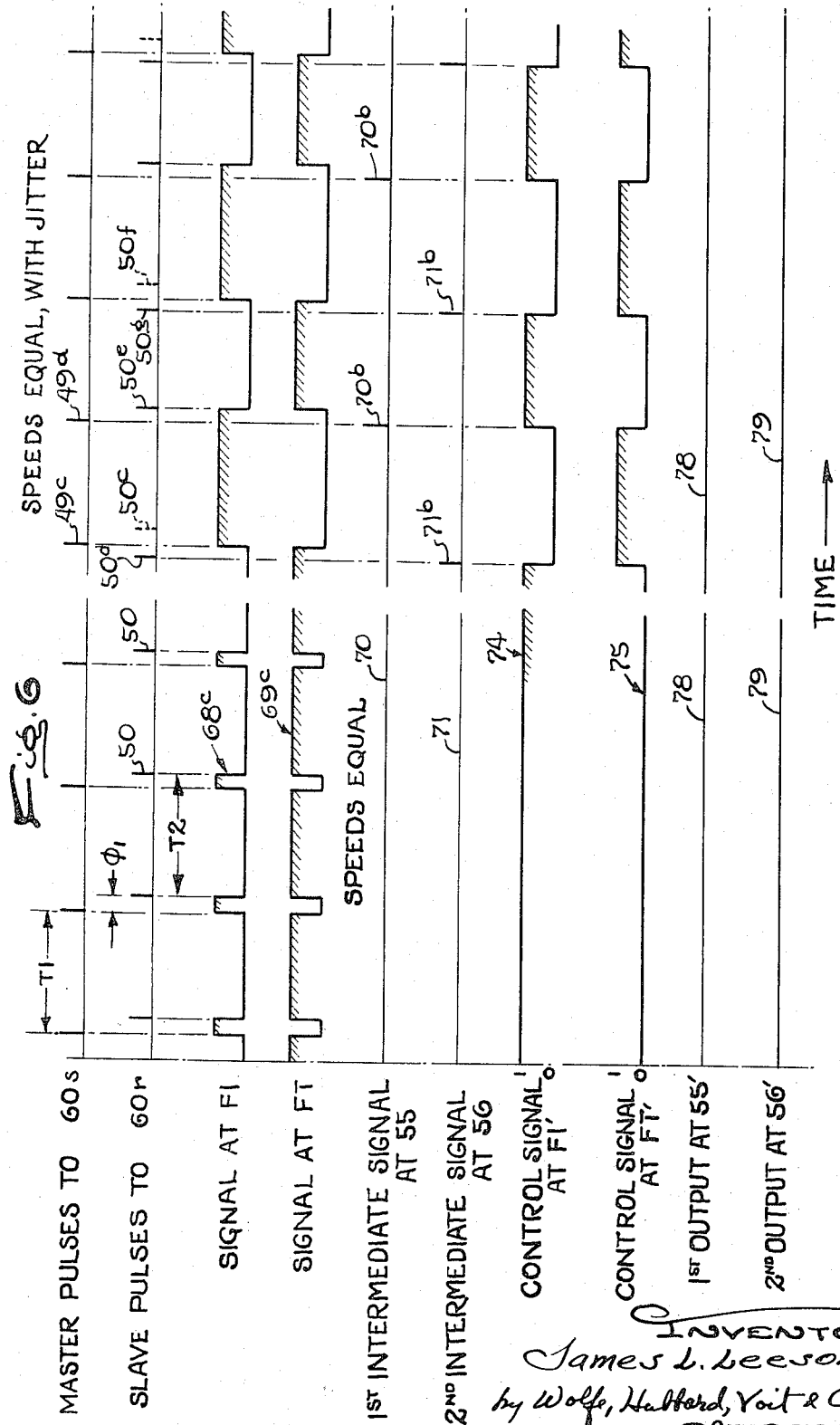

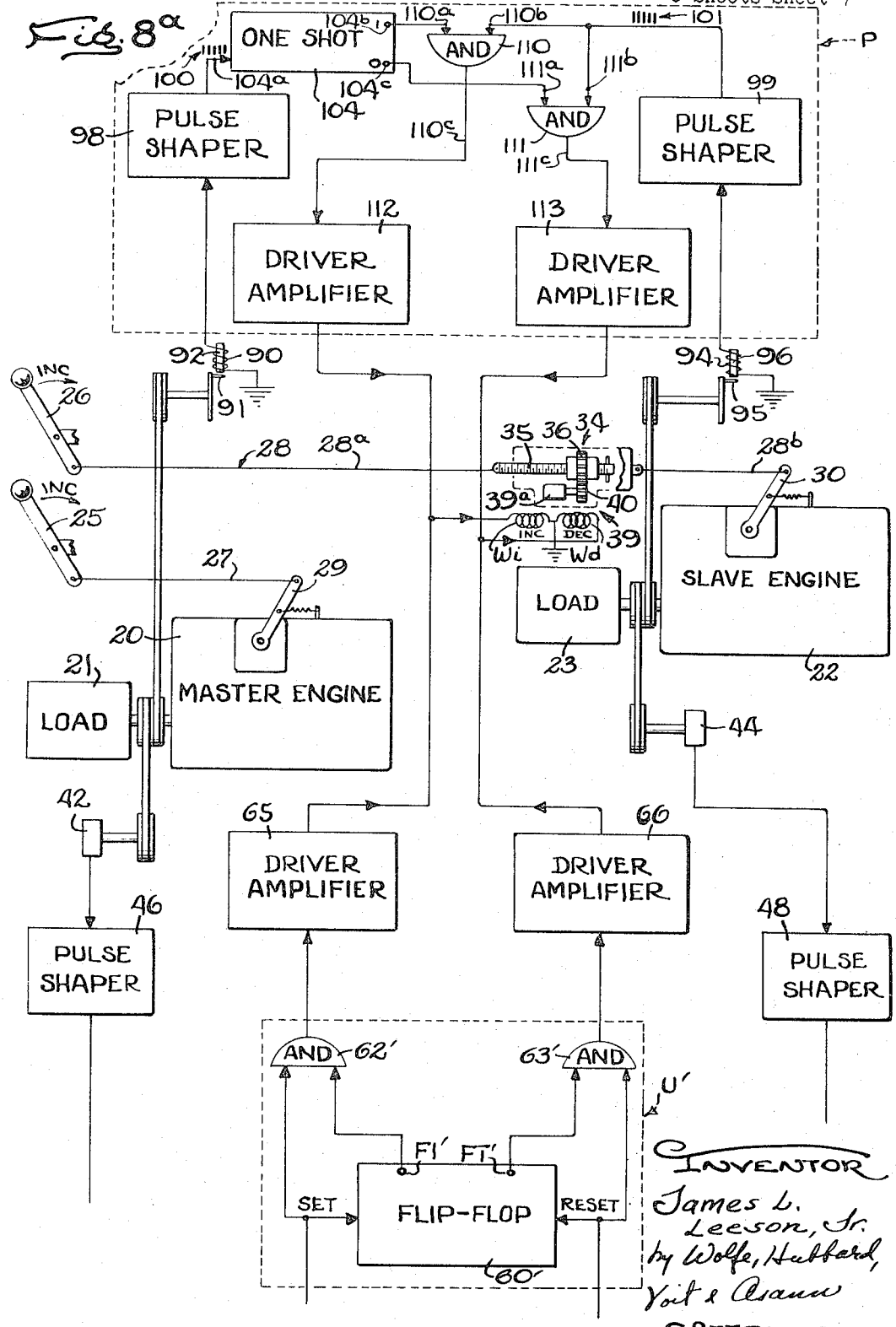

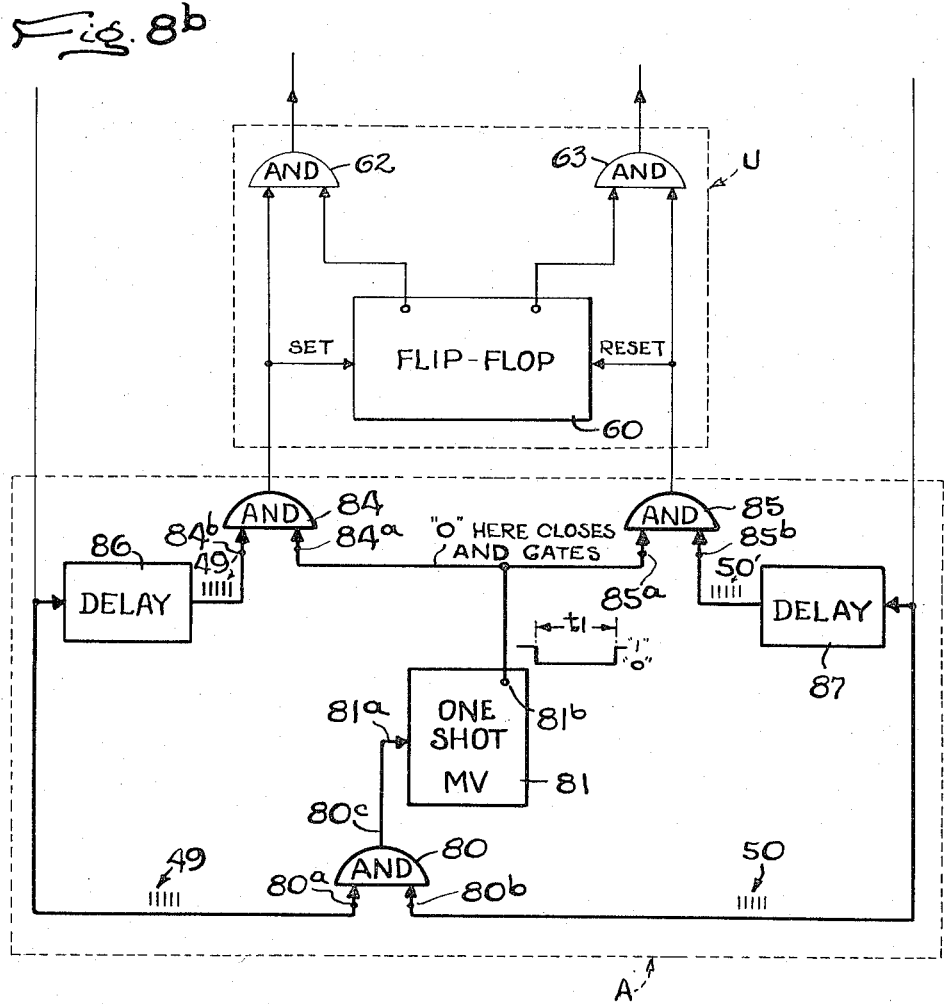

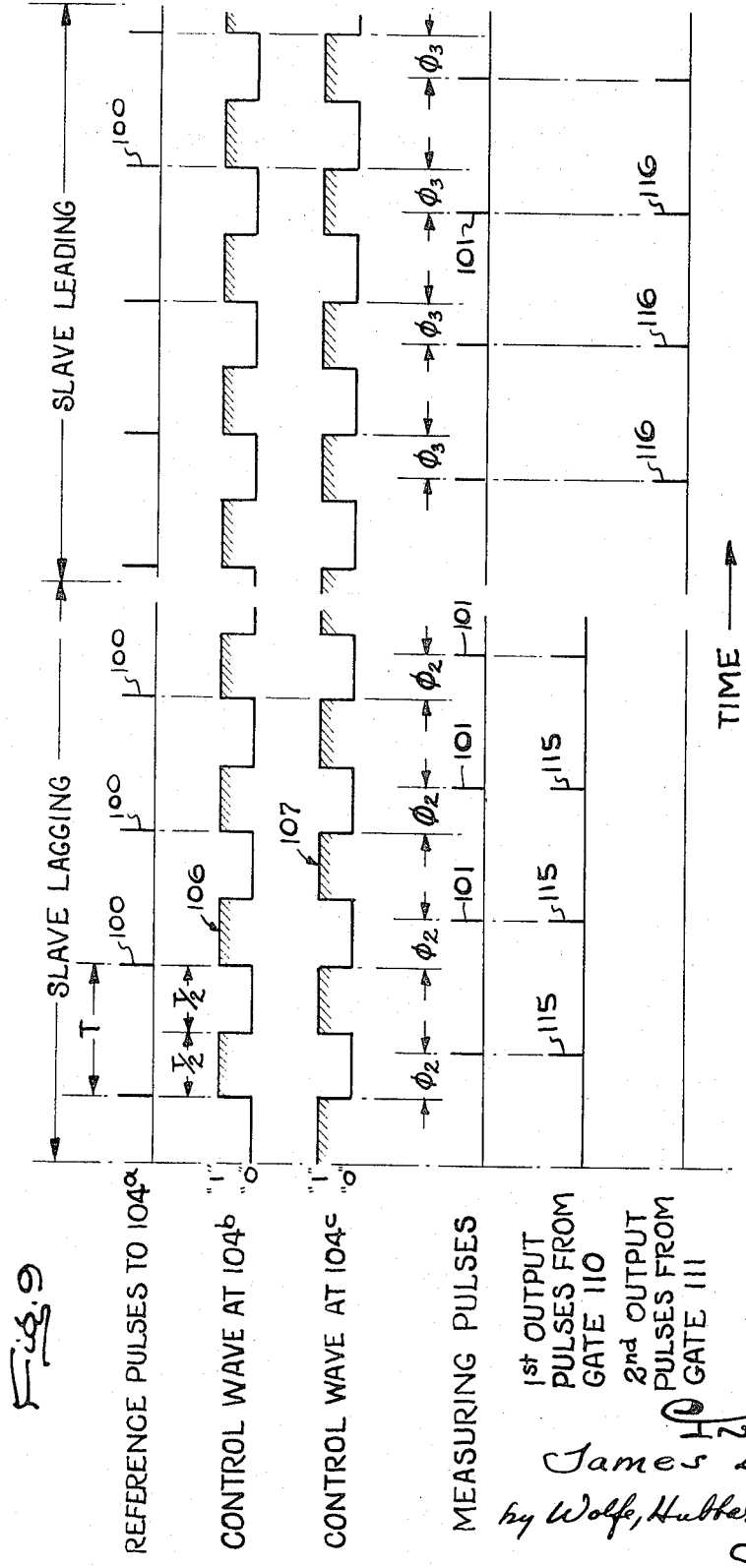

United States Patent Office 3,367,110
Patented Feb. 6, 1968

3,367,110
DIGITAL SYNCHRONIZING AND PHASE MATCHING SYSTEM
James L. Leeson, Jr., Rockford, Ill., assignor to Woodward Governor Company, Rockford, Ill., a corporation of Illinois
Filed Feb. 1, 1966, Ser. No. 524,315
17 Claims. (Cl. 60—97)

The present invention relates in general to systems for synchronizing two recurring events such as the frequencies of two repeating signal trains or the continuous rotations of two shafts. The invention also pertains to systems for maintaining the two recurring events, such as two repeating signal trains or shaft speeds, in constant phase relation or phase match.

More particularly, the invention pertains to synchronizing and phase matching systems which will find especially advantageous, but certainly not exclusive, use in controlling two prime movers so that their rotating shafts are brought to and maintained at speed equality, and then brought to and maintained in phase agreement.

As one example of such an application, it is highly desirable in the operation of a twin engine aircraft to keep both engines always at the same speed. The throttle levers by which the pilot manually sets the speeds of the engines are usually closely spaced so that they can be manipulated in unison, but there will almost always be some difference in the speeds of the two engines due to lack of precision in the settings of the throttle levers or the propeller pitches which determine the engine loads. Such speed inequality of two aircraft engines creates undesirable "beats," throbbing or vibration in the aircraft which is at least discomforting to the occupants and which may be damaging to the aircraft structure. For this reason it has been the practice to designate one engine to be the "master" and to make the other a "slave" which is automatically controlled to operate at the same speed as the master even though their throttle lever settings or their loads are not identical. But even this is not sufficient in some cases to eliminate undesirable vibrations, and thus the slave engine is sometimes further controlled to make its output shaft rotate with a constant phase relation to the master engine output shaft. This tends to cancel out the vibrations which might otherwise arise due to lack of perfect balance in the two engine crank shafts or other rotating parts.

It is the primary aim of the present invention to provide a synchronizing system which operates entirely on digital and discrete valued signals, requiring no smoothly variable analogue signals (such as those derived by integration of variable width or amplitude pulses or those created by sawtooth generators), and therefore being free of the inaccuracies which analogue signals entail due to drifting of power supplies or changes in the sensitivity of control components because of aging or temperature variations.

Corollary objects are to provide such a synchronizing system in which normal variations of power supply voltages, gains or other characteristics of amplifiers or signal lever discriminators, and other such factors, have substantially no deleterious effect on the precision of operation; and which may be constructed with relatively few, simple and highly reliable components which need respond only in an "on or off" fashion.

Another object of the invention is to provide a digital synchronizing system which operates to correct lack of synchronism with very small but rapidly occuring steps so that even if a few of the incoming signals or pulses are lost in the unlikely event of malfunction, the overall operation of the system is not adversely affected.

A further and important object of the invention is to eliminate the difficulties caused by "jitter" in the timing of pulses applied as input signal to a digital synchronizing system, and in a manner which requires the addition of only a few simple components to the basic synchronizing apparatus. Indeed, it is a feature of the invention that by cascading two substantially identical sub-assemblies like that used for speed synchronizing per se, one obtains both speed synchronizing and elimination of jitter effects. This gives rise to convenience and economy in the manufacture of the systems since sub-assemblies are simply duplicated in the latter case.

An additional and very important object is to provide an improved, simple and yet highly reliable phase matching system which operates entirely on digital signals and with digital logic devices, being less susceptible to errors due to drifting or inaccuracies in analogue signals or the detection of the values thereof.

A related object is to provide such a digital phase matching system which can be readily and optionally employed with a digital synchronizing system.

Other objects and advantages will become apparent as the following description proceeds, taken in conjunction with the accompanying drawings, in which:

FIGURE 1 is a block-and-line diagram of an exemplary embodiment of the present synchronizing system shown in the environment of controlling the speed of a slave engine to keep it equal to that of a master engine;

FIG. 2 is a timing diagram for various signals which occur in the apparatus of FIG. 1 when the speeds of the master and slave engines are equal;

FIG. 3 is a similar timing diagram showing the same signals whenever the slave engine is running faster than the master engine;

FIG. 4 is a timing diagram similar to FIG. 3, but illustrating the relationships of signals when the slave engine is running slower than the master engine;

FIG. 5 is a block-and-line diagram substantially identical to FIG. 1, but showing the aditional components (drawn in heavier lines) which are employed for the purpose of eliminating the effects of "jitter" due to torsional vibrations or the like;

FIG. 6 is a timing diagram illustrating the relationships between various signals which occur in the apparatus of FIG. 5 and illustrating how spurious responses due to torsional jitter are eliminated when the master and slave speeds are equal;

Figure 7:
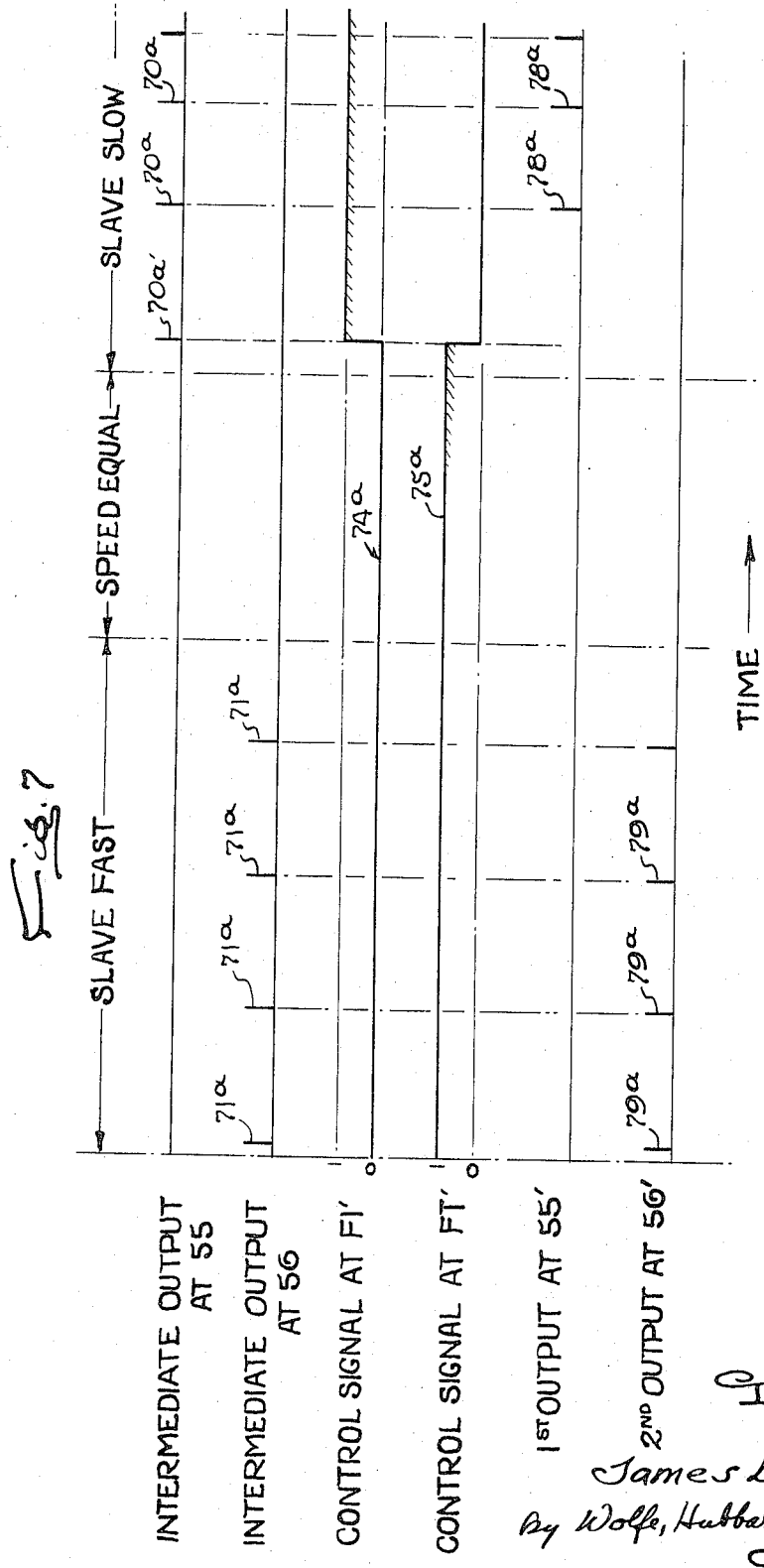
FIG. 7 is a timing diagram illustrating the operation of the apparatus of FIG. 5 as the slave speed changes from a value faster than that of the master to values equal and slower than the master.

FIGS. 8a and 8b when joined together are a block diagram similar to FIG. 5 but further illustrate (by those portions drawn in heavy lines) anti-coincidence apparatus and an automatic phase matching system;

FIG. 9 is a timing diagram showing the relationships of signals which occur in the phase matching system of FIG. 8 during the operation of the latter.

Referring now to FIG. 1, a synchronizing system embodying the present invention is there shown for bringing the speeds of two rotating prime movers into synchronism and maintaining them equal. The prime movers are diagrammatically illustrated as a master engine 20 driving a master load 21 and a slave engine 22 driving its load 23. Hand throttle levers 25, 26 are coupled by flexible wire cables 27, 28 to the speed setting arms 29, 30 of governors (not shown in detail) for the two respective engines 20 and 22. Manual adjustment of the levers 25, 26 either individually or in unison, serves to shift the arms 29, 30 in directions to increase or decrease the speeds of the engines 20, 22 for example by opening or closing the fuel throttles (not shown).

The position of the speed-controlling arm 30 for the slave engine 22 can be adjusted, and the fuel input to the slave engine changed, independently to the setting of the slave control lever 26. Preferably, this is accomplished by pulse responsive means which serve to move the arm 30 in small steps either in a speed increasing or decreasing direction. As here shown, the cable 28 connected between the lever 26 and the arm 30 includes two portions 28a, 28b with a lengthwise expandable or contractible link 34 interposed therebetween. The link includes a screw 35 (held against bodily rotation by means not shown) joined to the cable portion 28a and engaged by a nut 36 rotatable in a casing 38 joined to the cable portion 28b. The casing contains a bi-directional stepping motor 39 having its armature 39a connected to a pinion 40 meshed with external gear teeth on the nut 36. The details of such a stepping motor are familiar to those skilled in the art, and it will suffice to observe here that the motor includes forward and reverse windings $Wi$ and $Wd$ which, in response to each voltage or current pulse applied thereto, causes the armature 39a to step in a forward or reverse direction. It will be assumed for purposes of discussion herein that pulses applied to the winding $Wi$ cause the motor 39 to step the nut 36 in a direction to contract the lead screw 35 into the casing 38, thus causing the cable portion 28b to swing the arm 30 in a direction to increase the speed of the slave engine 22. Conversely, pulses applied to the motor winding $Wd$ causes the link 34 to expand lengthwise, so that the bias spring associated with the arm 30 causes the latter to move in a speed decreasing direction. Therefore, the motor windings $Wi$ and $Wd$ may conveniently be called the slave speed increasing or decreasing windings, respectively.

In order to produce first and second trains of recurring discrete signals which are respectively proportional in their frequencies to the speeds of the master and slave engines 20 and 22, electrical signal generators 42 and 44 are connected, as shown, to be driven by the respective engine shafts. In actual practice each generator may, of course, be driven from any auxiliary shaft of the engine which rotates in timed relation to the output shaft, and the generator is preferably arranged so that it produces about forty cycles per revolution of the output shaft. In the specific form here illustrated, the signal generators 42 and 44 may be permanent magnet alternators which produce sinusoidal voltages having frequencies proportional to the speeds of their associated driving shafts. The sinusoidal output voltages are passed through pulse shapers 46 and 48 in order to produce first and second trains of sharp, recurring pulses having repetition rates or frequencies respectively proportional to the speeds of the master and slave engines. Such pulses shown at 49 and 50 will be called the master and slave pulses, respectively. They are applied as the input signals to a synchronizing unit U to be described below.

The synchronizing logic unit

In accordance with the present invention, means are provided to produce a first type of output signal or a second type of output signal in response respectively to (a) the occurrence of two master pulses without an intervening slave pulse or (b) the occurrence of two slave pulses without an intervenign master pulse. Such first and second output signals appear on terminals 55 and 56, respectively, and are supplied to means which correctively change the speed of one engine (or the frequency of one input pulse train) in one sense or the other, respectively.

In carrying out the invention, the master pulses are caused to switch a bistate device to one of its states (or leave it in that state) and the slave pulses are caused to switch that same bistate device to its other state (or leave it in its other state). Although the bistate device may take any of several different forms well known per se to those skilled in the art, that there represented in block form is an Eccles-Jordan circuit commonly called a flip-flop 60. Such a flip-flop may be constructed, for example, from two transistors (not shown) and a few resistors and capacitors, the transistors being cross-coupled so that one is conducting when the other is non-conducting, and vice versa. Discrete signals or pulses applied to input terminals of such a flip-flop trigger it to switch rapidly from one condition to the other. As illustrated in FIG. 1, the flip-flop 60 in well known fashion has set or reset terminals 60s and 60r together with output terminals F1 and $\overline{F1}$. This is a conventional symbolic designation, indicating that an input pulse applied to the set terminal 60s switches the flip-flop to (or leaves it in) the "set" or "1" state, producing a binary "1" level signal at the F1 output terminal. Each pulse applied to the reset terminal 60r switches the flip-flop to (or leaves it in) the "reset" or "0" state, producing a binary "0" level signal at the F1 output terminal. The signal at the $\overline{F1}$ output terminal is simply the complement of that at the F1 output terminal, and thus has a binary "0" or "1" voltage level when the flip-flop is in the "1" or "0" states respectively. As here illustrated, the master and slave pulses 49 and 50 are respectively applied to the input terminals 60s and 60r so that under normal circumstances the flip-flop 60 will be repeatedly set and reset in response to the alternately occurring pulses in the first and second trains.

Further in carrying out the invention, logic devices in the synchronizing unit U are controlled according to the state of the flip-flop 60 so as to create the first or second type of output signal in the event that the flip-flop does not switch states (but on the contrary is left in its existing state) in response to the arrival of a master pulse or a slave pulse. In the illustrated embodiment, such logic devices take the form of two AND gates 62 and 63 having first input terminals 62a and 63a coupled to receive the master and slave pulses, respectively; and having second input terminals 62b and 63b connected to receive the control signals or voltages appearing at the flip-flop terminals F1 and $\overline{F1}$. The output terminals of the two AND gates are the two terminals 55 and 56 mentioned above.

As is well known, such AND gates produce an output signal only when both of their inputs simultaneously receive an input signal. Stated another way, each AND gate produces a binary "1" output only so long as both input terminals receive a binary "1" level input signal. Since the pulses applied to the terminal 62a may each be considered as a short "1" signal, the AND gate 62 will produce a pulse on its output terminal 55 in response to a given one of the master pulses 49 only if that master pulse applied at an instant when the flip-flop 60 is in its "1" state. Thus, an output pulse appears on terminal 55 only under those conditions where two master pulses occur without an intervening slave pulse having appeared to reset the flip-flop prior to the arrival of the second such master pulse.

On the other hand, the AND gate 63 will be "open" to pass a slave pulse applied to the terminal 63a only if the flip-flop 60 is already in its "0" state at the instant when such slave pulse arrives. This means that an output pulse will appear on the terminal 56 only as a result of two slave pulses occurring in succession without an intervening master pulse having appeared to set the flip-flop to the "1" state prior to the arrival of the second such slave pulse.

As more fully explained below, first output pulses will appear on the terminal 55 only if the slave engine 22 is running more slowly than the master engine 20, and second output pulses will appear on the terminal 56 only when the slave speed is higher than that of the master. To provide a corrective response to such first and second types of output pulses, they are respectively transmitted to the speed increasing or decreasing winding $Wi$ or $Wd$ of the stepping motor 39 so as to cause stepped movement of the arm 30 in a direction to increase or decrease the speed of the slave engine 22 until it equals that of the master engine. Preferably, the output pulses which appear at the terminals 55 and 56 are passed through driver amplifiers 65 and 66 in order to give a proper magnitude and shape to the pulses which are applied to the windings Wi and Wd.

The operation of the synchronizing system shown in FIG. 1 can best be understood with reference to the timing diagrams of FIGS. 2–4 which illustrate the various signals as they appear under different conditions. FIG. 2 shows the relationship of the master pulses 49 and the slave pulses 50 when the master and slave engines have equal speeds. Under this condition, the frequencies of the master and slave pulses 49 and 50 are equal, and the periods T1 between successive master pulses are equal to the periods T2 between successive slave pulses. Since each master pulse sets the flip-flop 60 to its "1" state, the signal voltage at the terminal F1 takes the form illustrated by the curve 68 in FIG. 2, having a relatively high or binary "1" value during those intervals following each master pulse until the next slave pulse appears to reset the flip-flop to its "0" state. Immediately following each slave pulse 50, the signal appearing at the terminal F1 has a relatively low or "0" value until the next master pulse appears to again switch the flip-flop to its "1" state. On the other hand, the control signal appearing at the terminal $\overline{F1}$ is the mirror image or complement as illustrated by the curve 69 in FIG. 2. It will be apparent that the gate 62 is conditioned to pass master pulses applied to its terminal 62a during those intervals when the signal represented at 68 in FIG. 2 has a "1" level (shaded portions); and conversely the AND gate 63 is conditioned to pass a slave pulse applied to its terminal 63a during those intervals when the control signal shown at 69 in FIG. 2 has a "1" level (shaded portions). If a master pulse occurs at an instant when the flip-flop 60 is in its "0" state, then it cannot pass through the AND gate 62 but it does act to switch the flip-flop to its "1" state. In that case, the gate 62 does not "open" quickly enough to pass the same master pulse which causes the flip-flop to switch because of the short but finite switching time of the flip-flop. The same is true of slave pulses which arrive when the flip-flop is in its "1" state; they switch the flip-flop to the "0" state but do not pass through the gate 63 to the terminal 56.

Inspection of FIG. 2 will confirm that when the master and slave engines are operating with equal speeds and the pulses 49 and 50 have equal frequencies, neither the AND gate 62 nor the AND gate 63 is conditioned to transmit a master pulse or a slave pulse to the output terminal 55 or 56. As each of the master pulses arrives, it finds the gate 62 closed and cannot pass to the output terminal 55. It does, however, switch the flip-flop 60 to the "1" state. As each of the slave pulses arrives it finds the flip-flop in the "1" state and the gate 63 thus "closed" so that it cannot pass to the output terminal 56; but it resets the flip-flop 60 to the "0" state. The output signals which appear on terminals 55 and 56 are illustrated at 70 and 71 in FIG. 2 by lines indicating that no pulses whatever appear. Thus, when the speeds of the engines are equal, no corrective action takes place.

FIGURE 3 illustrates the timing relationships existing when the slave engine is running faster than the master engine. Under these circumstances the master pulses 49 have a frequency less than the slave pulses 50, and the period T1 between succeeding master pulses is greater than the period T2 between successive slave pulses. The control signals appearing at the flip-flop terminals F1 and $\overline{F1}$ thus have the form shown at 68a and 69a, the flip-flop 60 normally being set by a master pulse and then reset by a slave pulse which appears before the succeeding master pulse. However, as the operation continues there will be periodic occasions when two slave pulses 50a, 50b occur in succession without an intervening master pulse. This will happen because the period T2 is shorter than the period T1. It will be seen from FIG. 3 that in those instances the first slave pulse 50a will trigger the flip-flop 60 causing it to switch to the "0" state and applying a binary "1" signal level to the input terminal 63b of the AND gate 63. By the time the next slave pulse 50b appears, the flip-flop 60 is still in its "0" state, and although that pulse has no effect on the flip-flop, it is transmitted through the AND gate 63 to the output terminal 56. Such output pulses appearing on the terminal 56 are shown at 71a in FIG. 3. As indicated at 70 in FIG. 3, no pulses are passed to the output terminal 55 when the slave engine is running faster than the master, because two master pulses cannot occur in succession without an intervening slave pulse. Of course, under the conditions illustrated by FIG. 3, the output pulses 71a will be transferred from the terminal 56 to the speed decreasing winding Wd and will cause the stepping motor 39 to shift the arm 30 in a speed decreasing direction. Thus, the condition illustrated by FIG. 3 cannot long persist since the speed of the slave engine 22 will be increased until the frequency of the slave pulses is increased to substantially equal that of the master pulses.

As shown in FIG. 4, when the slave engine is running at a speed which is slower than the master engine, the master pulses 49 will have a greater frequency and a shorter period T1 than the frequency and the period T2 of the slave pulses 50. Under these circumstances, the gate 63 can never be open when a slave pulse 50 appears, but periodically two succeeding master pulses 49a and 49b will occur without an intervening slave pulse. The first such master pulse 49a switches the flip-flop 60 to the "1" state, and causes the signal at terminal F1 (represented by the waveform 68b) to rise to the binary "1" level. Accordingly, the next master pulse 49b simply leaves the flip-flop in the "1" state, and it passes from he input terminal 62a through the gate 62 to the output terminal 55 where it appears as a pulse 70a. These output pulses 70a on the terminal 55 are thence applied to the speed increasing winding Wi in the motor 59 and the latter thus causes the speed-controlling arm 30 to be stepped in a direction to increase the speed of the slave engine 22. This corrective action will continue until the speed of the slave engine has been increased sufficiently to make the frequencies and periods of the master slave pulses substantially equal. As shown in FIG. 4, when the slave engine is running slower than the master engine, the control signal (represented at 69b) appearing at the terminal $\overline{F1}$ is never at a binary "1" level when a slave pulse 50 appears on the gate input terminal 63a. Thus, no output pulses appear on the terminal 56, as illustrated by the lack of pulses at 71 in FIG. 4.

It will be apparent from the foregoing that the apparatus shown in FIG. 1 is relatively simple in its organization requiring only conventional digital pulse handling circuitry, and yet it operates reliably to either decrease or increase the speed of the slave engine whenever it is above or below the speed of the master engine, so as to bring those speeds to and maintain them at equality.

*Elimination of time "jitter" effects*

In the use of the digital synchronizing apparatus described above to maintain the speeds of the two engines 20, 22 and the frequencies of the master and slave pulses 49, 50 equal, it may sometimes happen that the individual pulses in the first and second pulse trains are not equally spaced in time from one another. That is, although the frequency of a speed-representing generated pulse train may be quite constant on the average, the individual pulses may "jitter" back and forth from the precise precisions in time which they should theoretically occupy. This may occur particularly in the illustrated case where pulses whose frequency indicates speeds are produced by driving a signal generator from the shaft of a reciprocating engine. The output shaft of an internal combustion engine may in fact "torsionally vibrate" to a small extent so that its instantaneous speed is quite erratic even though its normally observed average speed is quite constant. Such torsional vibration is created, for example, (a) by torque pulses applied to the engine shaft because ignition in the individual cylinders of an internal combustion engine occurs at discrete time-spaced instants, (b) by loose bearings or other factors which create "piston slap," (c) by gears which do not uniformly transmit torque due to backlash or imperfectly mated teeth, (d) or by rotating parts which are not perfectly balanced. Thus, the angular velocity of the driven pulse generator may "jitter" and the pulses produced by it will not have perfectly uniform spacing in time even when the normally observed average speed of the engine is constant.

When generated pulses "jitter" from their normal time spacing, the effect may be to cause the digital synchronizing system to initiate speed corrective action although none is in fact required. This is graphically illustrated by FIG. 6 wherein the left portion shows operation of the synchronizing system with theoretically perfect, uniform spacing of input pulses, and the right portion shows the effect of pulse "jitter." In the left portion of FIG. 6 the master pulses 49 and the slave pulses 50 are shown with equal frequencies and equal periods T1 and T2, but with a relatively small phase angle φ1 separating successive ones of the master and slave pulses. Thus, the left portion of FIG. 6 illustrates a condition in which the speeds of the master and slave engines (FIG. 1) are constant and equal, so that the control signals at terminals F1 and F1̄ have the forms shown at 68c and 69c. It will be apparent that no speed-corrective output signals appear at the terminals 55 and 56, as represented by the lack of pulses at 70 and 71 in the left portion of FIG. 6. The system is thus in speed synchronism substantially as shown and described above with reference to FIG. 2.

However, the theoretically perfect and uniform spacing of the pulses 49 and the pulses 50 as illustrated in the left portion of FIG. 6 does not always occur in actual practice. As shown in the right portion of FIG. 6, that particular slave pulse which should appear at the phantom position 50c is assumed to occur earlier as a pulse 50d due to torsional vibration. It is assumed that the next slave pulses 50e appears at its normal position in time (lagging the previous master pulse by the phase angle φ1). And it is further assumed that the next slave pulse which would normally appear at the time position 50f is again displaced in time so as to appear as a pulse 50g which leads the corresponding master pulse by a short time interval. Thus, the pulses 50d, 50e, and 50g in the right portion of FIG. 6 represent "jittering" of the slave pulses back and forth about the normal instants in time which they should occupy. Of course, it is very possible and probable that the master pulses may also jitter back and forth in time, but the illustration in the right portion in FIG. 6 will suffice to illustrate the phenomenon and its adverse effect.

Notice from FIG. 6 that when the pulse 50d is shifted due to jitter so that it occurs prior to the master pulse 49c, it arrives when the flip-flop 60 (FIG. 1) is in the "0" state, and when the control signal 69c is at a binary "1" level. Thus, that slave pulse 50d passes through the AND gate 63 to appear at output terminal 56 as an output pulse 71b, even though no speed-corrective action is required. Similarly, with the assumption that the slave pulse 50e occurs subsequent to its associated master pulses 49d, the two master pulses 49c and 49d occur in succession without an intervening slave pulse. Thus, the master pulse 49d appears at an instant when the control signal 68c at the terminal F1 (FIG. 1) has a binary "1" level, and this master pulse passes through the gate 62 to appear at the output terminal 55 as an improper speed-increasing pulse 70b. Then, the next two slave pulses 50e and 50g occur without an intervening master pulse, and thus the slave pulse 50g passes through the gate 63 to appear as a speed-decreasing pulse 71b on the terminal 56.

From the foregoing, it will be seen that when the master and slave pulses 49 and 50 have substantially equal frequencies and are closely related in phase, torsional vibration and jitter can cause rapid pulsing of the stepping motor 39 (FIG. 1) first on one direction and then in the other. The result is indecisive operation, or a tendency to make the stepping motor stall or lock up. This effect of torsional vibration and pulse jitter is thus highly undesirable.

In keeping with an important aspect of the invention, the adverse effects of pulse jitter are obviated by treating the first and second output signals (previously described as appearing on the terminals 55 and 56) as intermediate signals which are supplied to a second binary logic unit U' as shown in FIG. 5. This second unit U' serves as means to produce first or second correction output signals respectively in response to (a) the occurrence of two of the first intermediate signals without an intervening second intermediate signal, or (b) the occurrence of two of the second intermediate signals without an intervening first intermediate signal.

This is most conveniently accomplished as illustrated in FIG. 5 by connecting the synchronizing unit U (previously described with reference to FIG. 1) in tandem with a second substantially identical logic unit U', the output pulses appearing at the terminals 55, 56 being intermediate signals which are applied as the input signals to the terminals 60s' and 60r' of the second unit. More particularly, it will be seen that the second binary logic unit U' comprises a bistate flip-flop 60' having its output terminals F1' and F1̄' connected to supply control signals to the input terminals 62b' and 63b' of two AND gates 62' and 63'. The intermediate signals which appear on the output terminals 55 and 56 of the first unit U are supplied as input signals to the set terminal 60s' and the reset terminal 60r', respectively, and also to the two AND gate terminals 62a' and 63a', respectively. The second unit U' thus operates in the same manner as that described previously for the first unit U, except that the unit U' receives as its input signals the output pulses or intermediate signals from the first unit. The output terminals 55' and 56' of the second unit U' are connected to supply output pulses appearing thereon through the driver amplifiers 66 and 65 to the slave speed increasing or decreasing windings Wi and Wd of the stepping motor 39.

Referring now to FIG. 6, the operation of the apparatus shown in FIG. 5 may be made clear. Since as illustrated by the left portion of FIG. 6 there are no intermediate pulses appearing on the terminals 55 and 56 (see curve portions 70 and 71) when the two engine speeds are equal and the master and slave pulses 49 and 50 have theoretically perfect time spacing, the second unit U' receives no input signals and produces no output signals on its terminals 55' and 56'. This is indicated by the curve portions 78 and 79. However, even with pulse jitter as illustrated in the right portion of FIG. 6, when the first intermediate signal 71b appears at the terminal 56, it serves to reset the flip-flop 60' so that the control signal 74 at the terminal F1' is switched from a binary "1" to a binary "0" level. The intermediate pulse 71b thus cannot pass through the AND gate 63' and does not appear as an output signal on the terminal 56'. Thus, the stepping motor 39 is not actuated even though pulse jitter has caused a spurious output signal 71b on the terminal 56.

The first intermediate pulse 71b in resetting the flip-flop 60' switches the control signal 74 at terminal F1' to a binary "0" level, and switches the control signal 75 at terminal F1̄' to a binary "1" level. When the next intermediate signal 70b appears at the terminal 55, therefore, it cannot pass through the AND gate 62' to the terminal 55'; and it serves to switch the flip-flop 60' from its "0" state to its "1" state. Thus, the spurious pulse 70b created by torsional jitter produces no output pulse to actuate the stepping motor 39. Similarly when the next intermediate pulse 71b appears on terminal 56 (as shown in FIG. 6), it finds the gate 63' closed and it resets the flip-flop 60' without passing to the output terminal 56'. With the speeds of the two engines 20, 21 equal, no pulses (as indicated at 78 and 79 in FIG. 6) are applied to the stepping motor 39 even though torsional vibration produces the pulse jitter illustrated by the slave pulses 50d, 50e, 50g in the right portion of FIG. 6.

Viewed in a different aspect, the second digital logic unit U' shown in FIG. 5 acts as a "filter" to block one speed-correcting output signal whenever the speed of the slave engine passes through equality with the speed of the master engine. The left portion of FIG. 7 illustrates the signal relationships when the slave is running faster than the master engine so that intermediate pulses 71a appear repeatedly on the terminal 56 in FIG. 5. As these successive pulses are applied to the second unit U', they attempt repeatedly to switch the flip-flop 60' to its "0" state, but that flip-flop is already in such state and the gate 63' is already open. Therefore, the intermediate pulses 71a created by the first unit U when the slave is running faster than the master engine pass through the second unit U' and appear as speed-correcting output signals 79a which are routed from the terminal 56' to the winding Wd and cause the stepping motor 39 to step the arm 30 in a direction to decrease the speed of the engine 22.

Then, when the speeds of the two engines become equal, the first unit U' produces no intermedite signals on its output terminals 55 and 56, and so no output signals appear on the terminals 55' and 56' of the second unit U'. This condition is illustrated by the mid-portion of FIG. 7. If the speed of the slave engine 22 should now further decrease and become slower than that of the master engine (refer to the right portion of FIG. 7), the first unit U' will produce a series of intermediate pulses 70a on its output terminal 55, and these will be supplied as input signals to the terminals 60s' and 62a' of the second unit U'. However, the first such intermediate signal 70a' will find the flip-flop 60' in its "0" state; it will not pass through the gate 62', but it will set the flip-flop 60' to its "1" state. The control voltages 74a and 75a at the terminals F1', $\overline{F1}'$ will thus be switched to the "1" and "0" levels, respectively. Thus, the first intermediate pulse 70a' following a condition of equal speeds does not pass to the output terminal 55', but the succeeding intermediate pulses 70a are passed through the AND gate 62' to appear as the final output pulses 78a. The latter are applied to the motor winding Wi and cause the arm 30 to be stepped in a direction to increase the speed of the slave engine.

The second unit U' thus renders the synchronizing system, as a whole, relatively insensitive to speed errors which exist just after the master and slave pulses indicate that there has been a change from equal speeds to unequal speeds. Yet, once that period of insensitivity has been exceeded, the system works in a normal fashion, while eliminating spurious responses due to pulse jitter. The arrangement of FIG. 5 may be supplemented to employ two or more of the units U' connected in tandem so as to provide a wider band of insensitivity and to eliminate the adverse effects of extremely wide time variations or jitter in the speed-indicating master and slave pulse trains.

*Elimination of coincidence effects*

The system of FIG. 5 is adequate for synchronizing two pulse train frequencies and two speeds in many applications. However, in certain cases there may be a noticeable hunting or lack of precision due to inconsistent responses when a master pulse and a slave pulse occur substantially in time coincidence. For example, if the flip-flop 60 is in its "0" state, and pulses 49 and 50 arrive at the terminals 60s and 60r almost simultaneously, the result might be either (a) to leave the flip-flop in its "0" state, (b) to switch the flip-flop to its "1" state and leave it there, or (c) to switch the flip-flop to its "1" state and then immediately reset it to the "0" state. In the first case, an intermediate pulse appears on the terminal 56 and the gate 63 is left conditioned to pass the next slave pulse; whereas in the second case, an intermedite pulse appears on the terminal 56 and the gate 62 is left conditioned to pass the next master pulse; and in the third case, no pulse appears on the terminals 55 and 56, and the apparatus is conditioned to pass the next slave pulse which is received. This inconsistency of response can exist even when the speeds of the two engines 20, 22 are equal if the master and slave pulses have substantially the same phase, thereby producing corrective action when none is, in fact, required.

To avoid this difficulty, provision is made to render the system non-responsive to both master and slave pulses which apepar at substantially the same instants in time. This is accomplished by an anti-coincidence unit A shown enclosed by dotted lines in FIG. 8b, the system of FIGS. 8a and 8b being otherwise similar to that of FIG. 5. The unit A includes means for delaying the master pulses and the slave pulses for equal short intervals d1 before they are permitted normally to enter the system as input pulses, together with means for measuring off a time interval t1 from each instant that a master and slave pulse appear in time coincidence. The delay d1 is shorter than the time interval t1, and means are provided to block entry of the delayed pulses into the system if they occur during the time interval t1.

As specifically shown in FIG. 8b, an AND gate 80 is coupled to receive on its two input terminals 80a, 80b the master and slave pulses 49 and 50. The output terminal 80c of that gate is connected to the triggering input terminal 81a of a monostable or "one-short" multivibrator 81. Only if a master pulse 49 and a slave pulse 50 occur in coincident, overlapping relationship will the AND gate 80 produce an output signal to trigger the one-shot device 81. Upon triggering, however, the one-shot device will switch from its "0" state to its "1" state, and then switch back automatically after a time interval t1. This is the well known characteristic operation of bistate one-shot multivibrators. An output terminal 81b of the one-shot device, and in this case, the complement terminal which normally resides at a binary "1" level, is placed at a binary "0" level during each time interval t1 measured off subsequent to triggering of the one-shot device 81.

The output terminal 81b is connected to input terminals 84a, 85a of two AND gates 84, 85. These gates receive on their second input terminals 84b and 85b pulses 49' and 50' which are created by passing the master and slave pulses 49 and 50 through delay devices 86 and 87 which produce equal time delay d1. The pulses 49' and 50' are thus identical to the master and slave pulses 49 and 50 but are delayed in time therefrom by equal short periods.

If the one-shot multivibrator is not triggered, the terminal 81b resides at a binary "1" level, and the AND gates 84 and 85 are both open. Under these circumstances, the delayed pulses 49' and 50' pass through the gates 84 and 85 to form the first and second input pulse trains to the synchronizing unit U, and the operation of the system as a whole is the same as described above. However, if a particular master pulse 49 occurs substantially simultaneously with one of the slave pulses 50, i.e., if those two pulses are not separated by more than the resolving time of the AND gate 80, then the one-shot multivibrator 81 will be triggered, and the terminal 81b will reside at a binary "0" for the ensuing period t1. Those same master and slave pulses will be converted into delayed pulses 49' and 50' which arrive at the terminals 84b and 85b after a delay period d1 and before the time interval t1 expires. Thus, those two delayed pulses will both be blocked by the gates 84 and 85, and cannot enter the synchronizing unit U as input signals. The anti-coincidence unit A makes the system as a whole consistently ignore master and slave pulses which are substantially time coincident. This eliminates inconsistency of response, yet, does not otherwise adversely affect the system because infrequent blocking of a few correction signals is hardly detectable.

The anti-coincidence circuitry herein described is not in itself a part of applicant's invention, and it is disclosed and claimed in the copending application Ser. No. 524,260 filed Feb. 1, 1966 in the name of Carl A. Helm, and assigned to the same assignee as this application.

*Phase matching logic unit*

Once the speeds of the engines 20, 22 have been made equal, it is desirable to further adjust the engines so that their shafts turn with a constant, fixed phase relation. When the slave shaft lags or leads the master shaft, the throttle of the slave engine may be opened or closed very slightly and momentarily to speed up or slow down the slave engine until phase agreement is reached. This is accomplished in accordance with the present invention by a very simple phase matching device P (FIG. 8a) which operates entirely on digital signals and in conjunction with the synchronizing system described above.

In order to produce first and second trains of discrete signals which by their relative timing or phase displacement represents the phase angle between the rotating shafts of the master and slave engines, means are provided to produce a reference pulse each time the master engine shaft passes through a predetermined angular position, and a similar means is employed to produce a measuring pulse each time the slave engine shaft passes through a predetermined angular position. The two angular positions may be, but need not be, identical. As illustrated in FIG. 8a, the reference pulses are generated in a stationary induction coil 90 each time a single projection or tooth 91 carried by a disk fixed to or driven from the master engine output shaft passes an associated core 92. Similarly, a measuring pulse is generated in an induction coil 94 at each instant that a single tooth 95 carried by a disk fixed to or driven from the slave engine output shaft passes an associated stationary core 96. The pulses induced in the windings 90 and 94 are passed through conventional amplifiers or pulse shapers 98 and 99 so that reference pulses 100 and measuring pulses 101 appear at their outputs as shown in FIG. 8a, such pulses by their relative time spacings being indicative of the phase angle between the master engine and slave engine output shafts.

To provide automatic correction in the event of phase mismatch after the engine speeds are equal, means are provided to produce a bi-valued control wave which has first and second values during approximately the first and second halves of the period between each two succeeding ones of the reference pulses in the first pulse train 100. In the present example, such means are constituted by a monostable or "one-shot" multivibrator 104 having its input triggering terminal 104a connected to receive the reference pulses 100, and so constructed that its natural timing interval is half of that which separates succeeding reference pulses when the master engine 20 is operating at its normal speed. Merely by way of example, if the normal operating speed of the engine 20 is 3000 r.p.m., twenty milliseconds elapse during each revolution of the output shaft. Thus, the reference pulses 100 are spaced apart by 20 milliseconds and the timing interval of the one-shot multivibrator 104 would be made, by choice of the resistance-capacitance circuits therein, equal to 10 milliseconds.

Referring for a moment to FIG. 9 the reference pulses 100 are there shown spaced apart by time periods T. The control wave produced at the output terminal 104b of the one-shot device 100 thus has the form illustrated at 106 in FIG. 9, i.e., it resides at a binary one level immediately after each reference pulse and for a time interval T/2 whereupon it returns to the binary "0" level. The control wave 106 appearing at the output terminal 104b may be passed through an inverter in order to derive a complementary waveform. Preferably, however, complement of the waveform 106 is obtained simply by connection to the opposite output terminal 104c of the one-shot device 104, the complement of the control wave 106 being shown at 107 in FIG. 9.

In order to create a first output signal in response to a measuring pulse occurring while the control waveform 106 has a first one of its two possible values, the output terminal 104b is connected to one input 110a of an AND gate 110, and the measuring pulses 101 are applied to a second input terminal 110b. Further, in order to create a second type of output signal in response to a measuring pulse occurring while the control wave 106 has the second of its two possible values, the complement control wave 107 is passed from the output terminal 104c to one input 111a of an AND gate 111 whose second input terminal 111b also receives the measuring pulses 101. The output terminals 110c and 111c of the two AND gates send their signals through drive amplifiers 112 and 113, respectively, to the throttle increasing and decreasing windings Wi and Wd of the stepping motor 39 previously described.

The operation of this structurally simple phase matching system will become clear from a brief study of FIG. 9 wherein the left portion illustrates the measuring pulses 101 lagging the reference pulses 100 by phase angles designated φ2. At the instant the measuring pulses 101 are applied to the input 111b of the gate 111, the complement control wave 107 is at a binary "0" level and the gate 111 is therefore closed so that it cannot pass pulses through the driver amplifier 113 to the winding Wd. However, at those instants when the measuring pulses 101 are applied to the terminal 110b, the control waveform 106 produced at the output terminal 104b of the one-shot device 104 is at a binary "1" level, and those pulses thus pass through the AND gate 110 to form output pulses 115 which are transmitted by the driver amplifier 112 to energize the motor winding Wi. Thus, whenever the slave engine output shaft lags the master output shaft, first output pulses 115 will be periodically applied to the winding Wi and the stepping motor 39 will shift the arm 30 in a direction to open the throttle of the slave engine.

The right portion of FIG. 9 illustrates the operation of the phase matching system whenever the slave output shaft leads the master output shaft and the measuring pulses 101 lead the corresponding reference pulses 100 by phase angles φ3. Under these conditions, the complement waveform 107 will reside at a binary "1" level when each of the measuring pulses 101 occurs, and those pulses will thus be transmitted by the gate 111 as output pulses 116 to the driver amplifier 113 and the motor winding Wd. On the other hand, when each of the measuring pulses 101 appears on the input terminal 110b of the gate 110, the control wave 106 of the output terminal 104b will be at a binary "0" level, and such pulses will be blocked by the gate 110 from reaching the driver amplifier 112.

It will now be understood that the one-shot multivibrator 104 constitutes a "period splitter" which measures off the first and second halves of the time interval between two successive ones of the reference pulses 100. In other words, it signals two respective intervals of time during which the master engine output shaft resides at positions separated within two ranges of 0° to +180° and 0° to −180° from the predetermined angular position mentioned above. The AND gate 110 is a "lag" gate which conducts pulses only if the measuring pulses lag the reference pulses, i.e., occur within a time interval corresponding to a 180° angle following the appearance of a reference pulse. The AND gate 111 constitutes a "lead" gate, which creates or transmits the second output pulses which are applied to the winding Wd only when the measuring pulses occur within a time interval corresponding to a 180° angle prior to the succeeding one of the reference pulses. The first and second output pulses appear on the terminals 110c and 111c thus constituting correction signals which serve to change the relative phase of the two engine output shafts in one sense or the other so as to bring those shafts back into phase agreement.

I claim as my invention:

1. In a system for maintaining the frequencies of first and second trains of recurring discrete signals in agreement, the combination comprising a bistate device switched to or left in a "1" state in response to an input signal applied to a "set" terminal therefor and switched to or left in a "0" state in response to an input signal applied to a "reset" terminal therefor, means for supplying said first and second trains of signals respectively to said "set" and "reset" terminals, first and second output terminals, first means controlled by said bistate device for applying an output signal to said first output terminal in response to those ones of the signals in the first train which appear when the bistate device is in its set state, second means controlled by said bistate device for applying an output signal to said second output terminal in response to those ones of the signals in said second train which appear when the bistate device is in its reset state, and means responsive to the signals on said first and second output terminals for correctively changing the frequency of one of said pulse trains respectively in one sense or the opposite sense.

2. The combination set forth in claim 1 further characterized in that said first and second means include first and second logic gates which receive and selectively transmit to said first and second output terminals certain ones of the signals in said first and second trains, said first and second logic gates being coupled to said bistate device and controlled in their signal transmitting ability according to the state of such device.

3. The combination set forth in claim 1 in which said first and second trains are electrical pulse trains, said bistate device is a flip-flop circuit, and said first and second means are electrical AND gates connected to be controlled by state-indicating potentials from said flip-flop circuit and selectively transmitting the pulses of said first and second trains to said first and second output terminals.

4. In a system for maintaining the speeds of first and second prime movers in synchronism, the combination comprising first and second means for generating first and second trains of recurring signals whose frequencies are respectively proportional to the speeds of the first and second prime movers, a bistate device settable to "1" and "0" states, means for supplying said first train of signals to said bistate device so that each one either leaves such device in or switches such device to its "1" state, means for supplying said second train of signals to said bistate device so that each one either leaves such device in or switches such device to its "0" state, means controlled by said bistate device for passing those ones of said first train of signals which arrive when the bistate device is already in its "1" state to a first output terminal, means controlled by said bistate device for passing those ones of said second train of signals which arrive when the bistate device is already in its "0" state to a second output terminal, and means responsive to signals at said first and second output terminals for changing the speed of said second prime mover in one sense or the other, respectively, thereby to bring the speeds of the two prime movers into agreement.

5. The combination set forth in claim 4 further characterized in that the last-recited means causes increases or decreases in the speed of said second prime mover in response to signals passed to said first or second output terminals, respectively.

6. In a system for achieving and maintaining speed synchronism of a master and a slave prime mover, the combination comprising means for creating a first train of pulses substantially proportional in their repetition rate to the speed of the master prime mover, means for creating a second train of pulses substantially proportional in their repetition rate to the speed of the slave prime mover, means coupled to receive said first and second trains of pulses and responsive thereto for producing an output pulse of one character when two pulses of the first train occur without an intervening pulse of the second train and for producing an output pulse of another character when two pulses of the second train occur without an intervening pulse of the first train, and means responsive to said pulses of said one or said other character for respectively increasing or decreasing the speed of said slave prime mover.

7. The combination set forth in claim 6 further characterized in that said means for producing output pulses of one character or another includes a bistate flip-flop circuit having "set" and "reset" input terminals respectively coupled to receive said first and second trains of pulses, means for producing an output pulse of said one character in response to any pulse of the first train arriving at said "set" terminal when the flip-flop circuit is already in its "set" state, and means for producing an output pulse of said other character in response to any pulse of said second train arriving at said "reset" terminal when the flip-flop circuit is already in its "reset" state.

8. In a system for adjusting and maintaining the frequencies of first and second trains of recurring time spaced signals in agreement, the combination comprising first means coupled to receive said first and second trains and responsive thereto for producing a first intermediate signal when two signals of the first train occur without an intervening signal of the second train and for producing a second intermediate signal when two signals of the second train occur without an intervening signal of the first train, second means coupled to receive said first and second intermediate signals and responsive thereto for producing a first output signal when two of said first intermediate signals occur without an intervening second intermediate signal and for producing a second output signal when two of said second intermediate signals occur without an intervening first intermediate signal, and means responsive to said first and second output signals for correctively changing the frequency of one of said signal trains in one sense or the other, respectively.

9. The combination set forth in claim 8 further characterized in that said first means includes a first bistate device having "set" and "reset" terminals respectively coupled to receive said first and second signal trains, means controlled by said first bistate device for creating a first intermediate signal in response to a first train signal occurring when the first bistate device is in its set state, and means for creating a second intermediate signal in response to a second train signal occurring when the first bistate device is in its reset state; and said second means includes a second bistate device having "set" and "reset" terminals respectively coupled to receive said first and second intermediate signals, means controlled by said second bistate device for creating a first output signal in response to a first intermediate signal occurring when the second bistate device is in its set state, and means for creating a second output signal in response to a second intermediate signal occurring when the second bistate device is in its reset state.

10. In a system for achieving and maintaining speed synchronism of a master and slave prime mover, the combination comprising means for creating a first train of pulses substantially proportional in their repetition rate to the speed of the master prime mover, means for creating a second train of pulses substantially proportional in their repetition rate to the speed of the slave prime mover, first means coupled to receive said first and second trains of pulses and responsive thereto for producing a first intermediate pulse when two pulses of the first train occur without an intervening pulse of the second train and for producing a second intermediate pulse when two pulses of the second train occur without an intervening pulse of the first train, second means coupled to receive the said first and second intermediate pulses and responsive thereto for producing a first type of output pulse when two first intermediate pulses occur without an intervening second intermediate pulse and for producing a second type of output pulse when two second intermediate pulses occur without an intervening first intermediate pulse, and means responsive to output pulses of the first or second type for respectively increasing or decreasing the speed of said slave prime mover.

11. The combination set forth in claim 10 further characterized in that said first means includes a first bistate flip-flop having "set" and "reset" input terminals to which said first and second pulse trains are respectievly applied, means including a first logic gate controlled according to the state of said first flip-flop for creating a first intermediate pulse in response to a pulse of said first train occurring when said first flip-flop is in its set state, and means including a second logic gate controlled according to the state of said first flip-flop for creating a second intermediate pulse in response to a pulse of said second train occurring when said first flip-flop is in its reset state; and characterized in that said second means includes a second bistate flip-flop having "set" and "reset" input terminals to which said first and second intermediate pulses are respectively applied, means including a third logic gate controlled according to the state of said second flip-flop for creating a first output pulse in response to a first intermediate pulse occurring when said second flip-flop is in its set state, and means including a second logic gate controlled according to the state of said second flip-flop for creating a second output pulse in response to a second intermediate pulse occurring when said second flip-flop is in its reset state.

12. In a system for bringing the phase of first and second recurring trains of pulses having substantially the same frequency into phase agreement, the combination comprising first means responsive to said first train of pulses for producing a control wave which has first and second values during approximately the first and second halves of the period between each two succeeding ones of the pulses in said first train, second means controlled by said wave for creating a first output signal in response to a pulse of the second train occurring while said control wave has said first value, third means controlled by said wave for creating a second output signal in response to a pulse of the second train occurring while said control wave has said second value, and fourth means responsive to the first or second output signals respectively for correctively changing the phase of one of said pulse trains in one sense or the other.

13. The combination set forth in claim 12 further characterized in that said first means includes a monostable multivibrator triggered by the pulses in said first train and having an "on" period equal approximately to one-half the time interval between successive ones of the pulses in the first train.

14. The combination set forth in claim 12 further characterized in that said second and third means respectively include a normally closed lag gate and a normally closed lead gate, means for supplying the pulses of said second train as inputs to said gates, means coupling the control wave from said first means to open the lag gate and the lead gate respectively during the said first and second halves of the period between each two succeeding ones of the pulses in said first train, whereby the pulses passed by the lag and lead gates respectively constitute said first and second output pulses.

15. In a system for maintaining the output shafts of two rotating prime movers, which are substantially matched in speed, in phase agreement, the combination comprising first means for generating first pulses at the instants the shaft of the first prime mover passes a predetermined angular position, second means for generating second pulses at the instants the shaft of the second prime mover passes the same angular position, third means responsive to said first pulses for producing a control signal having first and second values during the time intervals that the shaft of the first prime mover lies within 180° in a first or a second direction from said predetermined angular position, fourth means responsive to a second pulse occurring while the control signal has said first or second value for producing a first or second output pulse, respectively, and fifth means responsive to said first or second output pulses for respectively speeding up or slowing down one of said prime movers to bring said output shafts into phase agreement.

16. The combination set forth in claim 15 further characterized in that said third means includes a monostable multivibrator triggered by said first pulses and having an "on" period substantially equal to one-half the period between succesive ones of the first pulses, so that the output voltage of the monostable multivibrator is a control signal having one value or the other during the time intervals that the shaft of the first prime mover lies within 180° in a first or second direction from said predetermined angular position.

17. The combination set forth in claim 15 further characterized in that said fourth means includes two normally closed gates coupled to receive said second pulses and complementarily controlled by the control signal from said third means.

No references cited.

MARTIN P. SCHWADRON, *Primary Examiner.*

ROBERT R. BUNEVICH, *Examiner.*

Disclaimer 3,367,110.—*James L. Leeson, Jr.*, Rockford, Ill. DIGITAL SYNCHRONIZING AND PHASE MATCHING SYSTEM. Patent dated Feb. 6, 1968. Disclaimer filed Nov. 21, 1968, by the assignee, *Woodward Governor Company*.

Hereby enters this disclaimer to claims 1, 2, 3, 4, 5, 6 and 7 of said patent.
[*Official Gazette April 1, 1969.*]